US006985303B2

(12) United States Patent
Takatsuki

(10) Patent No.: US 6,985,303 B2
(45) Date of Patent: Jan. 10, 2006

(54) REAR FOCUS ZOOM LENS

(75) Inventor: Akiko Takatsuki, Saitama (JP)

(73) Assignee: Fujinon Corporation, Saitama (JP)

( * ) Notice: Subject to any disclaimer, the term of this patent is extended or adjusted under 35 U.S.C. 154(b) by 57 days.

(21) Appl. No.: 10/839,151

(22) Filed: May 6, 2004

(65) Prior Publication Data

US 2004/0223232 A1 Nov. 11, 2004

(30) Foreign Application Priority Data

May 8, 2003 (JP) ............................ 2003-129994
Oct. 7, 2003 (JP) ............................ 2003-348650

(51) Int. Cl.
*G02B 15/14* (2006.01)

(52) U.S. Cl. ...................................... 359/684; 359/685

(58) Field of Classification Search ................ 359/684, 359/685

See application file for complete search history.

(56) References Cited

U.S. PATENT DOCUMENTS 4,189,213 A 2/1980 Iizuka ........................ 359/683
5,764,420 A 6/1998 Yahagi ....................... 359/682

FOREIGN PATENT DOCUMENTS

| | | |
|---|---|---|
| JP | 7-151972 | 6/1995 |
| JP | 2893119 | 3/1999 |
| JP | 2988164 | 10/1999 |

*Primary Examiner*—David N. Spector
(74) *Attorney, Agent, or Firm*—Arnold International; Bruce Y. Arnold

(57) ABSTRACT

A rear focus zoom lens is disclosed that includes, in order from the object side: a first lens group having positive refractive power; a second lens group having negative refractive power; a third lens group having positive refractive power and including a stop; a fourth lens group having negative refractive power; and a fifth lens group having positive refractive power. The second lens group and the third lens group are moved along the optical axis for zooming, the fourth lens group is moved along the optical axis for focusing, and the fourth lens group comprises a doublet consisting of a negative lens element and a positive lens element. The fifth lens group may have a specified configuration which includes an aspherical surface and that satisfies a specified condition which insures that aberrations are satisfactorily corrected over the entire range of zoom.

11 Claims, 9 Drawing Sheets

REAR FOCUS ZOOM LENS

BACKGROUND OF THE INVENTION

Various zoom lenses have been developed for use in video cameras that are provided with a solid-state image sensor, such as a CCD (Charge Coupled Device). For example, a zoom lens that has a four lens group or a five lens group construction is known wherein the second lens group and the third lens group, in order from the object side, are moved to perform a change of magnification during zooming. In zoom lenses having such a construction, focusing techniques can be broadly classified into two categories, namely, those wherein the first lens group moves during focusing, and those wherein the first lens group is stationary and one or more of the other lens groups move during focusing. Tile latter category is termed herein a "rear focus zoom lens".

With a rear locus zoom lens, tile effective diameter of the first lens group can be smaller as compared with other types of zoom lenses wherein the entire first lens group is moved for focusing. Thus, miniaturization of the entire lens system becomes easy. Further, the movement of one or more lens groups that are comparatively small in size and thus lightweight, as compared to the first lens group, enables faster focusing. Thus, a rear focus zoom lens is characterized by the required driving force for moving the lens groups being small while enabling rapid focusing to be performed. In recent years, miniaturization of solid-state image sensors has rapidly progressed and this has enabled the size of video camera bodies to be miniaturized. Therefore, there has been a strong demand for a zoom lens that is both small in size and lightweight for mounting onto a video camera. From this viewpoint, a rear focus zoom lens is advantageous.

The rear focus zoom lenses that are disclosed in Japanese Laid-Open Patent Application H7-151972 and Japanese Patent Publication 2988164 have a five-lens-group construction, and these zoom lenses have adopted a method wherein the second lens group and the third lens group move during zooming. The zoom lens that is disclosed in Japanese Patent Publication 2893119 has a four-lens-group construction, and this zoom lens has adopted a method wherein the second lens group and the third lens group move during zooming. As focusing methods, examples are given wherein part or all of the lenses of the fourth lens group move during focusing. As a movement lens group for focusing, an example wherein the fourth lens group is comprised of a two-lens-element construction using lens elements that are separated by air is disclosed.

However, each of the above-discussed zoom lenses has a zoom ratio of approximately 10, and the angle of view at the wide-angle end remains about 60 degrees, so the development of a zoom lens having a higher zoom ratio (for example, approximately 14) and a wider angle of view (for example, approximately 70 degrees) has been desired. Further, in recent years, in order to achieve higher picture quality, an image pick-up device with a large number of pixels has been developed. With these developments, a higher performance zoom lens has also been demanded. Therefore, the development of a zoom lens having a smaller size, a wider angle of view and a higher zoom ratio, while maintaining high optical performance, has been desired.

BRIEF SUMMARY OF THE INVENTION

The present invention relates to a rear focus zoom lens that has a wide angle of view and a high zoom ratio, as discussed in the preceding paragraph, and that is suitable for use in a video camera having a solid-state image sensor, and especially a video camera for commercial use. More specifically, the present invention enables a rear focus zoom lens to be easily realized that is more compact, has a wider angle of view, and has a higher zoom ratio than previous rear focus zoom lenses while maintaining excellent correction of various aberrations over the entire range of zoom.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
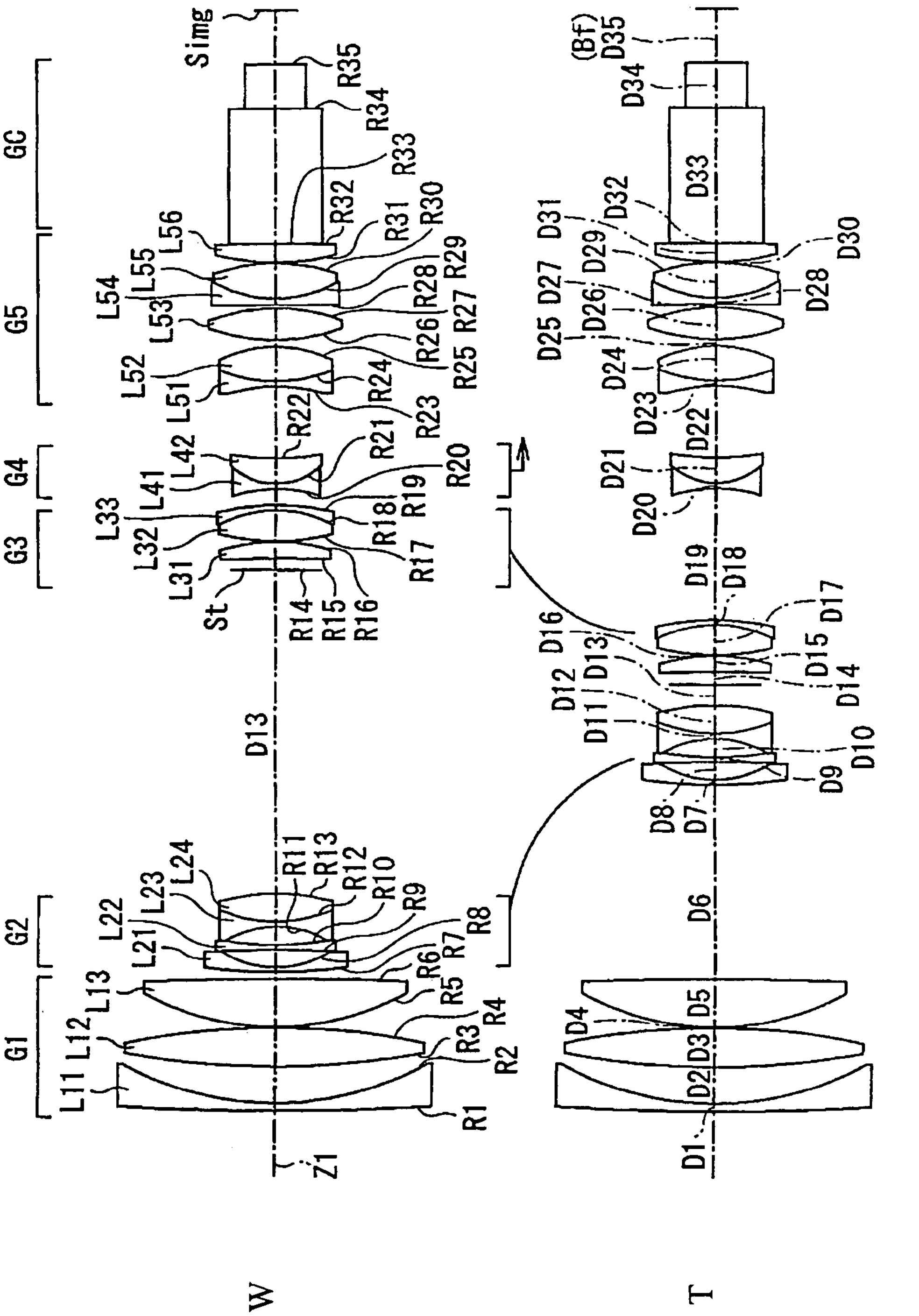
FIG. 1 is a cross section that shows the basic lens element configuration of a rear focus zoom lens according to Embodiments 1 and 2.

A general description of the rear focus zoom lens of the present invention will first be described with reference to FIG. 1 that shows Embodiment 1. In FIG. 1, optical elements are referenced by tile letter L followed by two numbers. The first number is the group number, in order from the object side, and the second number is the number of the lens within that group, in order from the object side along the optical axis Z1. The on-axis surface spacings of the various optical surfaces are referenced by the letter D followed by a number denoting their order from the object side of the zoom lens along the optical axis Z1, from D1 to D35. Similarly, the radii of curvature of the optical element surfaces, including lens surfaces, are referenced by the letter R followed by a number denoting their order from the object side of the zoom lens, from R1 to R35. In the same manner, the three lens groups are labeled G1–G5 in order from the object side of the zoom lens, GC denotes a color separation optical system, and Simg denotes the image plane.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens element or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is used herein to define an assembly of one or more lens components in optical series and with no intervening lens components that, during zooming, is movable as a single unit relative to other lens components. Thus, for example, in a zoom lens, a lens group may be stationary or movable with respect to an image plane of the lens group, and stationary lens elements of the zoom lens may define different lens groups based on these different lens groups being seperated by lens groups that move relative to these different lens groups and the image plane. More specifically, as an example, a lens group at the object side and a lens group at the image side of a zoom lens may be stationary, but they are not part of the same lens group because they are separated by other lens components that belong to other lens groups.

The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lens elements together. Such an arrangement is termed herein as a "doublet".

The rear focus zoom lens of the present invention is formed of, in order from the object side: a first lens group having positive refractive power; a second lens group having negative refractive power; a third lens group having positive refractive power and including a diaphragm stop (hereinafter termed a stop); a fourth lens group having negative refractive power; and a fifth lens group having positive refractive power. The second lens group is moved along the optical axis for changing the magnification during zooming and the third lens group is moved along the optical axis so as to compensate for what would otherwise be a shifting in the image plane position during zooming. The fourth lens group is formed of a doublet that is moved along the optical axis for focusing, with the doublet being formed of a negative lens element and a positive lens element that are intimately bonded.

A wider angle of view and a higher zoom ratio lens system with its aberrations favorably corrected over the entire range of zoom is more easily realized when the second lens group comprises, in order from the object side, two negative lens elements and a doublet consisting of a negative lens element and a positive lens element.

Use of the doublet in the fourth lens group facilitates in making the focusing lens group more compact (i.e., downsizing) and allows more rapid focusing as compared to using lens elements that are separated by air. Furthermore, axial chromatic aberration can be more easily corrected.

In Embodiments 4–6, the fifth lens group is formed of, in order from the object side: a biconcave lens element; two doublets, each consisting of a negative lens element and a positive lens element that are intimately bonded; and a positive lens element having at least one aspherical surface. The shape of the aspherical surface is given by Equation (A) below:

$$Z=(Y^2/R)/[1+(1-K\cdot Y^2/R^2)^{1/2}]+\Sigma(A_i\cdot Y^i) \qquad \text{Equation (A)}$$

where

Z is the length (in mm) of a line drawn from a point on the aspheric lens surface at a distance Y from the optical axis to the tangential plane of the aspheric surface vertex, R is the radius of curvature of the aspheric lens surface on the optical axis, Y is the distance (in mm) from the optical axis, K is the eccentricity, and $A_i$ is the ith aspheric coefficient and the summation extends over i.

In embodiments of the invention disclosed below, only the aspheric coefficients $A_4$, $A_6$, $A_8$, and $A_{10}$ are non-zero.

With such a design of the fifth lens group, in order to assure that aberrations are satisfactorily corrected over the entire range of zoom and to provide a wider angle of view at the wide-angle end as well as a high zoom ratio, it is preferable that the following Condition (1) is satisfied:

$$5.7<f5/fw<6.3 \quad \text{Condition (1)}$$

where f5 is the focal length of the fifth lens group, and fw is the focal length of the rear focus zoom lens at the wide-angle end.

Various embodiments of the invention will now be set forth in detail.

Embodiment 1

FIG. 1 shows the lens element configuration and lens group arrangement of the rear focus zoom lens according to Embodiment 1 of the present invention at the wide-angle end W and at the telephoto end T.

The rear focus zoom lens of this embodiment may be used, for example, in video cameras having a solid-state image pickup element. Thus, an image pickup element (not shown), may be provided at the image plane Simg of the rear focus zoom lens. Various optical elements may be provided between the fifth lens group G5 and the image plane, depending on the configuration of the camera on which the zoom lens is mounted. In the configuration shown, a color separation optical system GC, such as a color separating prism, is provided.

In the rear focus zoom lens of the present invention, the second lens group G2 is moved along the optical axis for changing the image magnification during zooming and the third lens group G3 is moved along the optical axis during zooming for correcting what would otherwise be a shifting of the image plane during zooming. The fourth lens group is moved along the optical axis for focusing, and the first lens group G1 and the fifth lens group G5 are both fixed in position during both zooming and focusing.

The first lens group G1 may be formed of, for example, three lens components L11 to L13. The lens component L11 may be, for example, a negative meniscus lens element with its convex surface on the object side. Each of the lens components L12 and L13 may be, for example, a biconvex lens element.

The second lens group G2 may be formed of, for example, four lens components L21 to L24. More particularly, it is preferable that the second lens group includes, in order from the object side, three lens components L21, L22, and L23, each of negative refractive power, and a positive lens component L24, with the negative lens component L23 and the positive lens component L24 each being lens elements that are formed as a doublet. The lens component L21 may be, for example, a lens element of negative refractive power and a meniscus shape with its convex surface on the object side. The lens component L22 may be, for example, a biconcave lens element. In tile configuration shown in FIG. 8, the lens component L22 has negative refractive power and a meniscus shape, with its convex surface on the object side. The lens component L23 may be, for example, a biconcave lens element and the lens component L24 may be, for example, a biconvex lens element.

The third lens group G3 may be formed of, for example, three lens components L31 to L33 positioned on the image side of a stop St. The lens components L32 and L33 may be, for example, lens elements formed into a doublet. In the configuration shown in FIG. 8, the lens components L31 and L32 are lens elements that are formed into a doublet.

The fourth lens group G4 may be formed of, for example, a doublet consisting of negative lens element L41 and positive lens element L42. The negative lens element L41 may have, for example, a biconcave shape and the positive lens element L42 may have, for example, a meniscus shape with its convex Surface on the object side. The fourth lens group G4 is moved toward the image plane when focusing on a nearby object, as compared to its position when focused at infinity, as indicated by the bracket and arrow in FIG. 1.

The fifth lens group G5 is a relay lens group, and may be formed of, for example, six lens components L51 to L56. In the lens element configuration of Embodiment 3 shown in FIG. 8, the fifth lens group is formed of five lens elements, namely, lens element L50 and lens elements L53 to L56.

The rear focus zoom lens according to Embodiment 1 is characterized by the design of the second lens group G2 and the fourth lens group G4. The configurations of the other lens groups are not limited to those shown in the figures. Thus, the number and morphology of the lens elements in these other lens groups can be modified.

The efficacy of a rear focus zoom lens having the configuration as described above will now be given.

In the rear focus zoom lens according to the invention, the second lens group G2 is moved along the optical axis in order to change the magnification when zooming, and the third lens group G3 is moved along the optical axis when zooming so as to maintain the image plane at a fixed position during zooming. On the other hand, the fourth lens group G4 is moved along the optical axis for focusing. The fourth lens group G4 is formed of a doublet, which enables down-sizing of the focusing lens group as compared to using lens elements in the fourth lens group that are separated by air. Therefore, less driving force is required for moving the fourth lens group and thus rapid focusing of this lens group can be achieved. Furthermore, axial chromatic aberration can be more easily corrected.

More particularly, the second lens group may be formed of, in order from the object side, three negative lens elements L21, L22, and L23 and positive lens element L24. The negative lens element L23 and the positive lens element L24 are formed into a doublet so that the negative refractive power of the second lens group is spread over the three negative lens elements L21, L22, and L23. This way, aberrations can be satisfactorily corrected from the wide-angle end to the telephoto end. Hence, a lens system with a wider angle of view and higher zoom ratio can be more easily realized.

The first lens group may be formed of, in order from the object side: a negative lens component L11, a positive lens component L12, and a positive lens component L13. Such a construction particularly facilitates the correction of spherical aberration and astigmatism at the telephoto end.

The rear focus zoom lens according to this embodiment is advantageous for achieving a compact design (i.e., down-sizing). Moreover, having the fourth lens group G4 that is used for focusing be formed into a doublet allows further down-sizing as compared to prior art zoom lenses, while maintaining favorable correction of aberrations. In particular, with the other lens groups having the preferable configurations as described above, a wider-angle and higher zoom ratio lens system can be more easily realized. For example, a lens system having a zoom ratio of approximately 14 and a field angle of approximately 70 degrees can be easily realized.

Table 1 below lists the lens group and the surface number #, in order from the object side, the radius of curvature R (in mm) of each surface, the on-axis spacing D (in mm) between surfaces, as well as the index of refraction $N_d$ and the Abbe Number $\upsilon_d$ (both at the d-line) of each optical element of the rear focus zoom lens according to Embodiment 1.

TABLE 1

| | # | R | D | $N_d$ | $\nu_d$ |
|---|---|---|---|---|---|
| G1 | 1 | 406.72 | 1.22 | 1.84665 | 23.8 |
| | 2 | 48.01 | 5.74 | | |
| | 3 | 127.13 | 6.10 | 1.72916 | 54.7 |
| | 4 | −110.25 | 0.10 | | |
| | 5 | 40.92 | 7.62 | 1.75500 | 52.3 |
| | 6 | −510.03 | D6 (variable) | | |
| G2 | 7 | 73.64 | 0.80 | 1.83481 | 42.7 |
| | 8 | 15.19 | 2.78 | | |
| | 9 | −327.65 | 0.80 | 1.83400 | 37.2 |
| | 10 | 46.55 | 2.89 | | |
| | 11 | −15.28 | 0.80 | 1.78590 | 44.2 |
| | 12 | 21.88 | 4.32 | 1.80517 | 25.4 |
| | 13 | −33.32 | D13 (variable) | | |
| G3 | 14 | ∞ (stop) | 2.00 | | |
| | 15 | −289.59 | 2.53 | 1.64417 | 40.8 |
| | 16 | −28.69 | 0.10 | | |
| | 17 | 35.36 | 4.78 | 1.58804 | 66.4 |
| | 18 | −18.63 | 0.80 | 1.84665 | 23.8 |
| | 19 | −36.89 | D19 (variable) | | |
| G4 | 20 | −22.23 | 0.80 | 1.77250 | 49.6 |
| | 21 | 10.00 | 3.93 | 1.84665 | 23.8 |
| | 22 | 40.98 | 11.05 | | |
| G5 | 23 | −25.79 | 0.80 | 1.84500 | 43.5 |
| | 24 | 22.75 | 5.35 | 1.51499 | 54.4 |
| | 25 | −19.80 | 1.00 | | |
| | 26 | 29.60 | 4.88 | 1.49700 | 81.6 |
| | 27 | −28.56 | 0.50 | | |
| | 28 | −921.11 | 1.00 | 1.80610 | 33.3 |
| | 29 | 19.66 | 5.36 | 1.49700 | 81.6 |
| | 30 | −28.94 | 0.10 | | |
| | 31 | 37.00 | 2.86 | 1.73253 | 54.7 |
| | 32 | −265.48 | 0.00 | | |
| GC | 33 | ∞ | 21.00 | 1.70154 | 41.1 |
| | 34 | ∞ | 6.75 | 1.51633 | 64.1 |
| | 35 | ∞ | Bf = 8.25 | | |

Table 2 below lists the values at the wide-angle end, at a middle position and at the telephoto end, of the focal length f, the FNO., and the variable on-axis surface spacings D6, D13, and D19 between the lens groups that move during zooming of the rear focus zoom lens according to Embodiment 1.

TABLE 2

| | f | FNO. | D6 | D13 | D19 |
|---|---|---|---|---|---|
| wide-angle end | 4.43 | 1.63 | 1.00 | 50.40 | 2.57 |
| middle position | 17.72 | 1.96 | 21.57 | 22.56 | 9.84 |
| telephoto end | 60.25 | 2.43 | 30.15 | 3.23 | 20.59 |

Figure 2A:
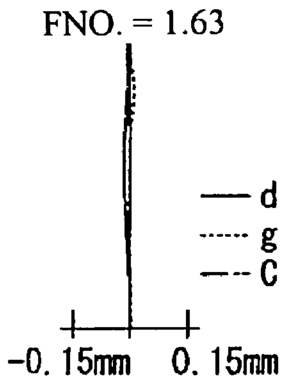
FIGS. 2A–2C show the spherical aberration, astigmatism, and distortion, respectively, at the wide-angle end of the rear focus zoom lens according to Embodiment 1.
Figure 2B:
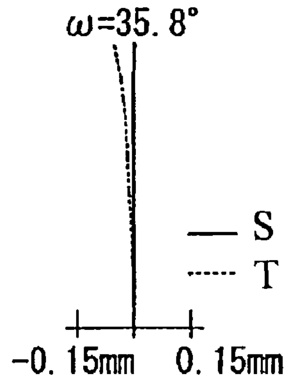
Figure 2C:
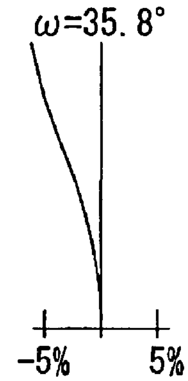
Figure 3A:
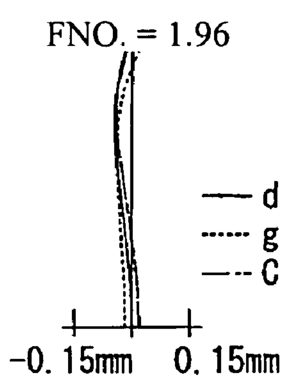
FIGS. 3A–3C show the spherical aberration, astigmatism, and distortion, respectively, in the middle of the zoom range of the rear focus zoom lens according to Embodiment 1.
Figure 3B:
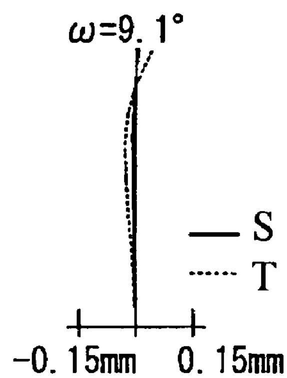
Figure 3C:
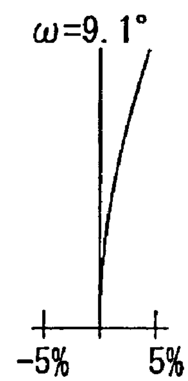
Figure 4A:
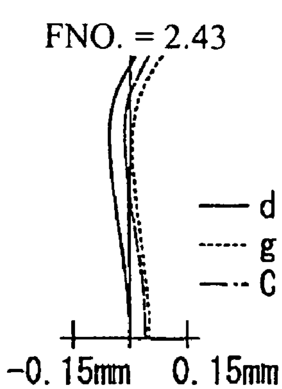
FIGS. 4A–4C show the spherical aberration, astigmatism, and distortion, respectively, at the telephoto end of the rear focus zoom lens according to Embodiment 1.
Figure 4B:
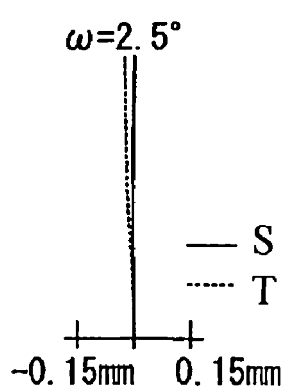
Figure 4C:
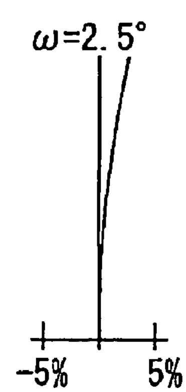

FIGS. 2A–2C show the spherical aberration, astigmatism, and distortion, respectively, at the wide-angle end (FNO.=1.63, f=4.43 mm, and ω (the half-field angle)=35.8°), FIGS. 3A–3C show the spherical aberration, astigmatism, and distortion, respectively, in the middle of the zoom range (FNO.=1.96, f=17.72 mm, and ω (the half-field angle)=9.1°), and FIGS. 4A–4C show the spherical aberration, astigmatism, and distortion, respectively, at the telephoto end (FNO.=2.43, f=60.25 mm, and ω (the half-field angle)=2.5°) of the rear focus zoom lens according to Embodiment 1. The spherical aberration is shown in FIGS. 2A, 3A, and 4A for the d-line (587.6 nm), g-line (435.8 nm), and C-line (656.3 nm), and the astigmatism is shown in FIGS. 2B, 3B and 4B for the sagittal image surface S and the tangential image surface T. In FIGS. 2C, 3C and 4C, the distortion is shown for the d-line. As is apparent from these figures, these aberrations are favorably corrected over the entire range of zoom for this embodiment.

Embodiment 2

The basic lens element configuration of Embodiment 2 is the same as for Embodiment 1, and thus FIG. 1 is also representative of this embodiment. However, in Embodiment 2, the construction values as listed in Table 3 differ from those listed in Table 1.

Table 3 below lists the lens group and the surface number #, in order from the object side, the radius of curvature R (in mm) of each surface, the on-axis spacing D (in mm) between surfaces, as well as the index of refraction $N_d$ and the Abbe Number $\upsilon_d$ (both at the d-line) of each optical element of the rear focus zoom lens according to Embodiment 2.

TABLE 3

| Group | # | R | D | $N_d$ | $\nu_d$ |
|---|---|---|---|---|---|
| G1 | 1 | 335.06 | 1.22 | 1.84665 | 23.8 |
| | 2 | 48.22 | 6.07 | | |
| | 3 | 127.48 | 5.99 | 1.72915 | 54.7 |
| | 4 | −114.07 | 0.10 | | |
| | 5 | 40.88 | 7.62 | 1.73465 | 54.5 |
| | 6 | −527.12 | D6 (variable) | | |
| G2 | 7 | 72.63 | 0.80 | 1.83480 | 42.7 |
| | 8 | 14.60 | 2.77 | | |
| | 9 | −1990.44 | 0.80 | 1.83400 | 37.1 |
| | 10 | 49.26 | 2.87 | | |
| | 11 | −14.98 | 0.80 | 1.80439 | 39.6 |
| | 12 | 21.99 | 4.29 | 1.84665 | 23.8 |
| | 13 | −34.13 | D13 (variable) | | |
| G3 | 14 | ∞ (stop) | 2.00 | | |
| | 15 | −281.18 | 2.53 | 1.67429 | 40.9 |
| | 16 | −28.66 | 0.10 | | |
| | 17 | 35.18 | 4.73 | 1.59766 | 65.0 |
| | 18 | −18.87 | 0.80 | 1.84665 | 23.8 |
| | 19 | −38.85 | D19 (variable) | | |
| G4 | 20 | −22.20 | 0.80 | 1.79021 | 49.0 |
| | 21 | 9.60 | 4.03 | 1.84665 | 23.8 |
| | 22 | 43.27 | 10.65 | | |
| G5 | 23 | −25.28 | 0.80 | 1.84500 | 43.5 |
| | 24 | 21.83 | 5.40 | 1.51499 | 55.8 |
| | 25 | −19.58 | 1.00 | | |
| | 26 | 29.70 | 4.99 | 1.49700 | 81.5 |
| | 27 | −26.71 | 0.50 | | |
| | 28 | −654.09 | 1.00 | 1.80609 | 33.3 |
| | 29 | 19.41 | 5.40 | 1.49700 | 81.5 |
| | 30 | −28.79 | 0.10 | | |
| | 31 | 37.81 | 2.87 | 1.72607 | 55.2 |
| | 32 | −220.36 | 5.00 | | |
| GC | 33 | ∞ | 21.00 | 1.70154 | 41.1 |
| | 34 | ∞ | 6.75 | 1.51633 | 64.0 |
| | 35 | ∞ | Bf = 8.25 | | |

Table 4 below lists the values at the wide-angle end, at a middle position and at the telephoto end, of the focal length f, the FNO., and the variable on-axis surface spacings D6, D13, and D19 between the lens groups that move during zooming of the rear focus zoom lens according to Embodiment 2.

TABLE 4

| | f | FNO. | D6 | D13 | D19 |
|---|---|---|---|---|---|
| wide-angle end | 4.43 | 1.63 | 1.00 | 50.39 | 2.59 |
| middle position | 17.72 | 1.95 | 22.01 | 22.35 | 9.62 |
| telephoto end | 60.24 | 2.42 | 30.82 | 3.10 | 20.06 |

Figure 5A:
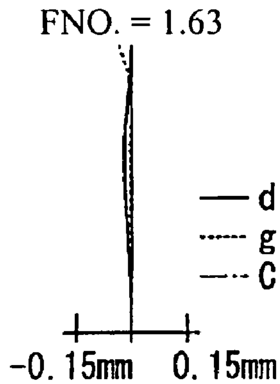
FIGS. 5A–5C show the spherical aberration, astigmatism, and distortion, respectively, at the wide-angle end of the rear focus zoom lens according to Embodiment 2.
Figure 5B:
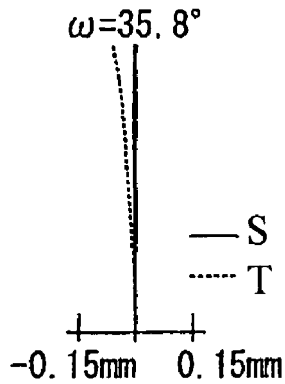
Figure 5C:
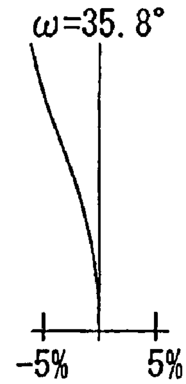
Figure 6A:
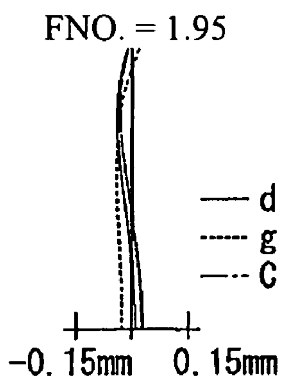
FIGS. 6A–6C show the spherical aberration, astigmatism, and distortion, respectively, in middle of the zoom range of the rear focus zoom lens according to Embodiment 2.
Figure 6B:
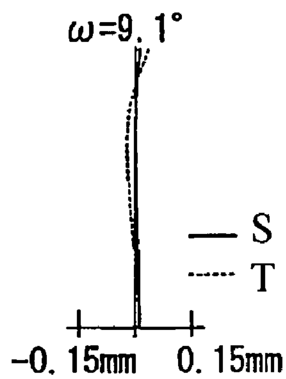
Figure 6C:
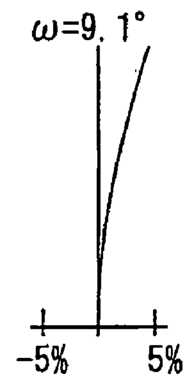
Figure 7A:
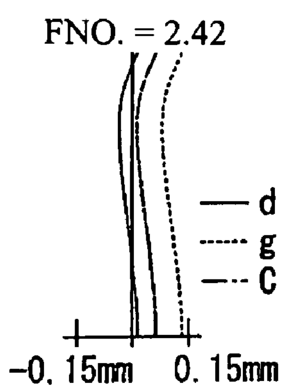
FIGS. 7A–7C show the spherical aberration, astigmatism, and distortion, respectively, at the telephoto end of the rear focus zoom lens according to Embodiment 2.
Figure 7B:
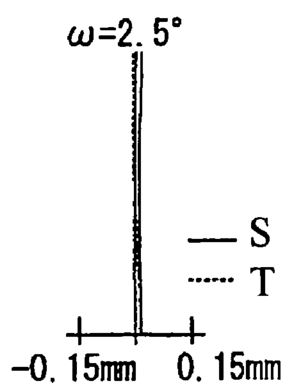
Figure 7C:

FIGS. 5A–5C show the spherical aberration, astigmatism, and distortion, respectively, at the wide-angle end (FNO.=1.63, f=4.43 mm, and ω (the half-field angle)=35.8°), FIGS. 6A–6C show the spherical aberration, astigmatism, and distortion, respectively, in the middle of the zoom range (FNO.=1.95, f=17.72 mm, and ω (the half-field angle)=9.1°), and FIGS. 7A–7C show the spherical aberration, astigmatism, and distortion, respectively, at the telephoto end (FNO.=2.42, f=60.24 mm, and ω (the half-field angle)=2.5°) of the rear focus zoom lens according to Embodiment 2. The spherical aberration is shown in FIGS. 5A, 6A, and 7A for the d-line (587.6 nm), g-line (435.8 nm), and C-line (656.3 nm), and the astigmatism is shown in FIGS. 5B, 6B and 7B for the sagittal image surface S and the tangential image surface T. In FIGS. 5C, 6C and 7C, the distortion is shown for the d-line. As is apparent from these figures, these aberrations are favorably corrected over the entire range of zoom for this embodiment.

Embodiment 3

Figure 8:
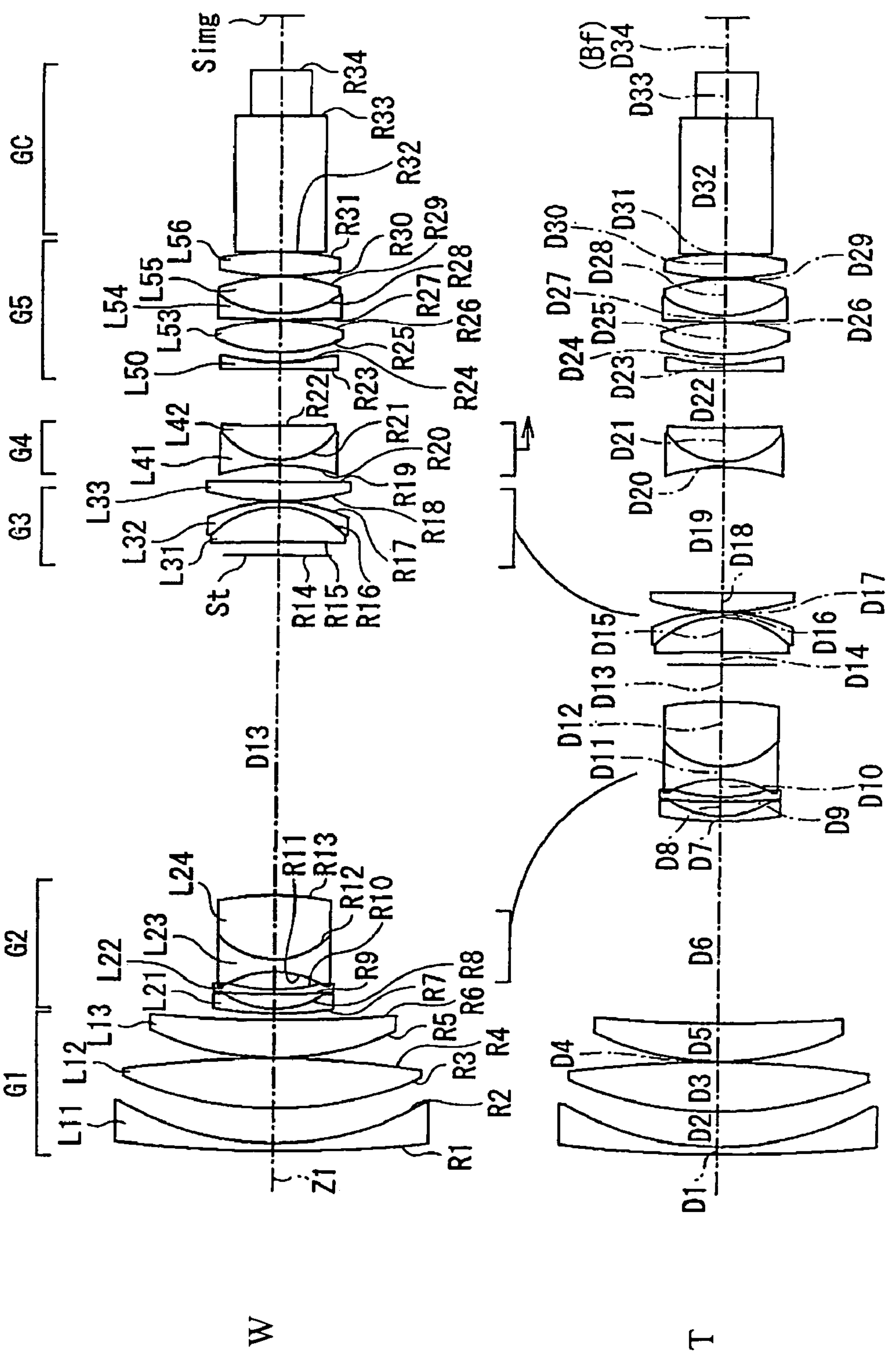
FIG. 8 is a cross section that shows the basic lens element configuration of a rear focus zoom lens according to Embodiment 3.

FIG. 8 is a cross section that shows the lens element configuration of a rear focus zoom lens according to Embodiment 3. This embodiment differs from Embodiments 1 and 2 in that the lens element L13 is no longer biconvex but in this embodiment it is a positive meniscus lens with its object-side surface convex. Also, lens element L22 is no longer biconcave, but instead has a negative meniscus shape with its convex surface on the object side. In lens group G3, a positive meniscus lens is positioned on the image side of a doublet rather than on the object side of the doublet as in Embodiments 1 and 2, and in lens group G5 a biconcave lens element is positioned on the object side of the lens group rather than a doublet.

Table 5 below lists the lens group and the surface number #, in order from the object side, the radius of curvature R (in mm) of each surface, the on-axis spacing D (in mm) between surfaces, as well as the index of refraction $N_d$ and the Abbe Number $\upsilon_d$ (both at the d-line) of each optical element of the rear focus zoom lens according to Embodiment 3.

TABLE 5

| Group | # | R | D | $N_d$ | $\nu_d$ |
|---|---|---|---|---|---|
| G1 | 1 | 210.40 | 1.22 | 1.84500 | 22.7 |
| | 2 | 46.04 | 5.45 | | |
| | 3 | 56.92 | 7.80 | 1.70694 | 56.1 |
| | 4 | −154.78 | 0.10 | | |
| | 5 | 43.78 | 5.92 | 1.79285 | 48.7 |
| | 6 | 212.72 | D6 (variable) | | |
| G2 | 7 | 52.52 | 0.80 | 1.84500 | 43.5 |
| | 8 | 14.05 | 2.22 | | |
| | 9 | 94.02 | 0.80 | 1.84500 | 35.6 |
| | 10 | 25.92 | 2.74 | | |
| | 11 | −15.78 | 1.94 | 1.84490 | 36.8 |
| | 12 | 11.73 | 10.00 | 1.82955 | 24.2 |
| | 13 | −51.30 | D13 (variable) | | |
| G3 | 14 | ∞ (stop) | 2.00 | | |
| | 15 | −357.80 | 5.43 | 1.69904 | 56.3 |
| | 16 | −14.38 | 0.80 | 1.84499 | 25.0 |
| | 17 | −25.15 | 0.10 | | |
| | 18 | 38.46 | 2.99 | 1.80879 | 47.1 |
| | 19 | −5893.54 | D19 (variable) | | |
| G4 | 20 | −29.39 | 0.80 | 1.84408 | 43.6 |
| | 21 | 11.14 | 5.21 | 1.84499 | 22.7 |
| | 22 | 130.82 | 8.66 | | |
| G5 | 23 | −496.01 | 1.00 | 1.84499 | 43.5 |
| | 24 | 32.87 | 1.48 | | |
| | 25 | 23.83 | 4.87 | 1.49000 | 56.9 |
| | 26 | −32.35 | 0.10 | | |
| | 27 | 151.67 | 1.00 | 1.84499 | 24.7 |
| | 28 | 16.60 | 5.61 | 1.49005 | 71.7 |
| | 29 | −28.17 | 0.00 | | |
| | 30 | 41.88 | 3.67 | 1.58174 | 67.4 |
| | 31 | −45.78 | 5.00 | | |
| | 32 | ∞ | 21.00 | 1.70154 | 41.1 |
| GC | 33 | ∞ | 6.75 | 1.51633 | 64.0 |
| | 34 | ∞ | Bf = 8.25 | | |

Table 6 below lists the values at the wide-angle end, at a middle position and at the telephoto end, of the focal length f, the FNO., and the variable on-axis surface spacings D6, D13, and D19 between the lens groups that move during zooming of the rear focus zoom lens according to Embodiment 3.

TABLE 6

| | f | FNO. | D6 | D13 | D19 |
|---|---|---|---|---|---|
| wide-angle end | 4.45 | 1.66 | 1.00 | 52.65 | 2.59 |
| middle position | 17.80 | 1.96 | 22.43 | 24.33 | 9.48 |
| telephoto end | 60.51 | 2.44 | 31.25 | 5.69 | 19.30 |

Figure 9A:
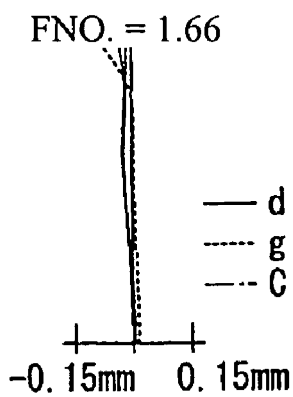
FIGS. 9A–9C show the spherical aberration, astigmatism, and distortion, respectively, at the wide-angle end of the rear focus zoom lens according to Embodiment 3.
Figure 9B:
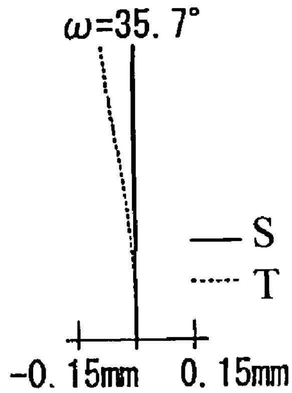
Figure 9C:
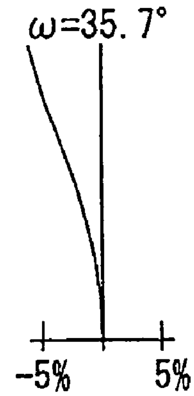
Figure 10A:
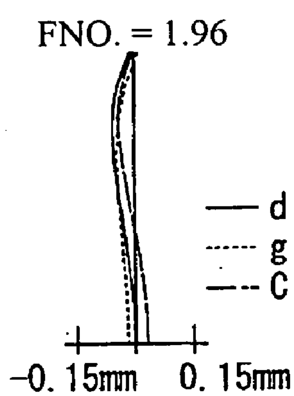
FIGS. 10A–10C show the spherical aberration, astigmatism, and distortion, respectively, in the middle of the zoom range of the rear focus zoom lens according to Embodiment 3.
Figure 10B:
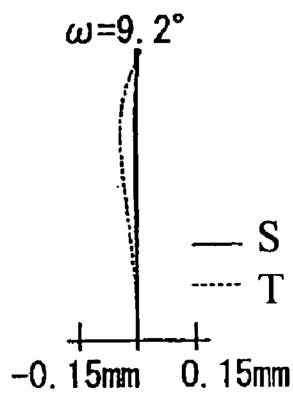
Figure 10C:
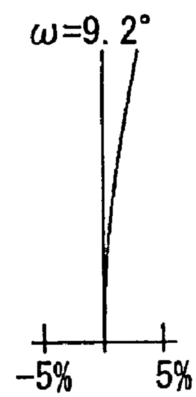
Figure 11A:
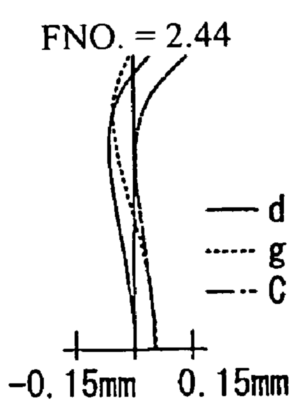
FIGS. 11A–11C show the spherical aberration, astigmatism, and distortion, respectively, it the telephoto end of the rear focus zoom lens according to Embodiment 3.
Figure 11B:
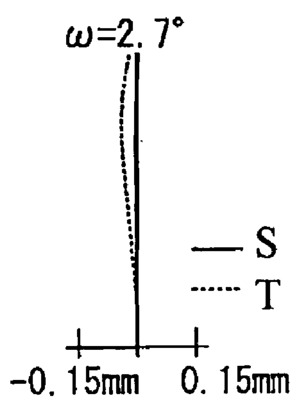
Figure 11C:

FIGS. 9A–9C show the spherical aberration, astigmatism, and distortion, respectively, at the wide-angle end (FNO.=1.66, f=4.45 mm, and ω (the half-field angle)=35.7°), FIGS. 10A–10C show the spherical aberration, astigmatism, and distortion, respectively, in the middle of the zoom range (FNO.=1.96, f=17.80 mm, and ω (the half-field angle)=9.2°), and FIGS. 11A–11C show the spherical aberration, astigmatism, and distortion, respectively, at the telephoto end (FNO.=2.44, f=60.51 mm, and ω (the half-field angle)=2.7°) of the rear focus zoom lens according to Embodiment 3. The spherical aberration is shown in FIGS. 9A, 10A, and 11A for the d-line (587.6 nm), g-line (435.8 nm), and C-line (656.3 nm), and the astigmatism is shown in FIGS. 9B, 10B and 11B for the sagittal image surface S and the tangential image surface T. In FIGS. 9C, 10C and 11C, the distortion is shown for the d-line. As is apparent from these figures, these aberrations are favorably corrected over the entire range of zoom for this embodiment.

Embodiment 4

Figure 12:
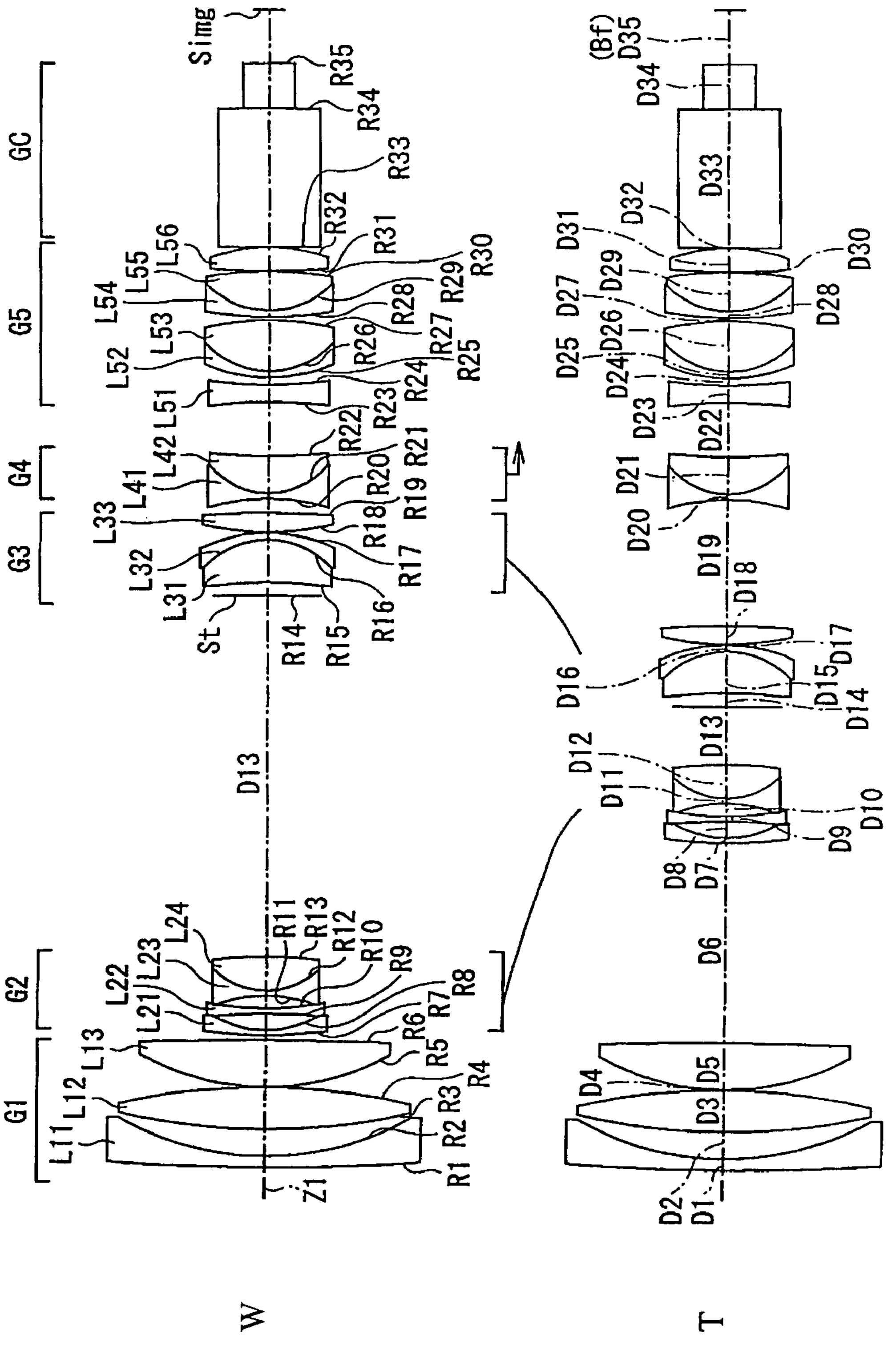
FIG. 12 is a cross section that shows the basic lens element configuration of a rear focus zoom lens according to Embodiments 4–6.

FIG. 12 shows the lens element configuration and lens group positions of the rear focus zoom lens according to Embodiment 4 of the present invention at the wide-angle end W and at the telephoto end T. This embodiment has a zoom ratio of approximately 14.

In the rear focus zoom lens of this embodiment, the first lens group G1 is formed of, for example, three lens components L11 to L13. The lens components L11 to L13 have nearly the same basic morphology as those in FIG. 1.

The second lens group G2 may be formed of, for example, four lens components L21 to L24. The lens components L21 to L24 have nearly the same basic morphology as those in FIG. 1.

The third lens group G3 may be formed of, for example, three lens components L31 to L33 positioned on the image side of a stop St. The lens components L31 and L32 may be lens elements formed as a doublet.

The fourth lens group G4 may be formed of a doublet that includes a negative lens element L41 and a positive lens element L42. The lens elements L41 and L42 have nearly the same basic morphology as those in FIG. 1.

The fifth lens group G5 is a relay lens group that may be formed of, for example, lens components L51 to L56. More specifically, this lens group may be formed of, in order from the object side: a biconcave lens element L51; a first doublet consisting of lens element L52 of negative refractive power and lens element L53 of positive refractive power; a second doublet consisting of lens element L54 of negative refractive power and lens element L55 of positive refractive power; and lens element L56 having at least one aspherical surface. The rear focus zoom lens according to this embodiment is characterized by the fifth lens group. The configurations of the other lens groups are nearly the same as those in FIG. 1.

In the two doublets in the fifth lens group, the negative lens elements L52 and L54 may each have, for example, a meniscus shape with its convex surface on the object side, and the positive lens elements L53 and L55 may be, for example, biconvex. The positive lens element L56 may be, for example, biconvex and have an aspherical surface on its object side.

It is preferable that the fifth lens group G5 satisfy the above Condition (1).

In the rear focus zoom lens of this embodiment, the fifth lens group G5 includes two doublets so that lateral color and axial chromatic aberration at the wide-angle end are favorably corrected. The lens element L56 of positive refractive power has at least one aspherical surface so that spherical aberration at the wide-angle end is favorably corrected.

It is preferable in the real focus zoom lens of the present invention that the exit pupil be sufficiently far from the image plane so as to prevent the angles of incidence, as measured from the surface normal, of rays onto the dichroic surface of the color separation optical system GC from being too large. When the lower limit of Condition (1) is not satisfied, the exit pupil becomes too close to the image plane, which is not preferable. When the upper limit of Condition (1) is not satisfied, spherical aberration at the wide-angle end is over-corrected, which is not preferable.

In the rear focus zoom lens according to this embodiment, the configuration of the fifth lens group G5 can be optimized to favorably correct various aberrations, particularly chromatic aberration and spherical aberration. Hence, a wider-angle and higher zoom ratio lens system can be more easily realized. This embodiment is otherwise similar in efficacy and effects to the rear focus zoom lens of Embodiment 1.

Table 7 below lists the lens group and the surface number #, in order from the object side, the radius of curvature R (in mm) of each surface, the on-axis spacing D (in mm) between surfaces, as well as the index of refraction $N_d$ and the Abbe Number $\upsilon_d$ (both at the d-line) of each optical element of the rear focus zoom lens according to Embodiment 4. The surface 31 having a * to the right of the surface number is aspheric, having a shape defined by Equation (A) above.

TABLE 7

| Group | # | R | D | $N_d$ | $\nu_d$ |
|---|---|---|---|---|---|
| G1 | 1 | 328.12 | 1.80 | 1.84660 | 23.9 |
| | 2 | 45.56 | 4.18 | | |
| | 3 | 99.75 | 6.53 | 1.60300 | 65.4 |
| | 4 | −99.75 | 0.10 | | |
| | 5 | 39.30 | 7.19 | 1.77250 | 49.6 |
| | 6 | −592.56 | D6 (variable) | | |
| G2 | 7 | 67.41 | 0.80 | 1.83480 | 42.7 |
| | 8 | 15.63 | 2.57 | | |
| | 9 | −88.10 | 0.80 | 1.83480 | 42.7 |
| | 10 | 45.87 | 2.01 | | |
| | 11 | −20.65 | 0.80 | 1.83480 | 42.7 |
| | 12 | 11.33 | 5.29 | 1.80517 | 25.4 |
| | 13 | −62.17 | D13 (variable) | | |
| G3 | 14 | ∞ (stop) | 2.10 | | |
| | 15 | −65.43 | 6.52 | 1.71299 | 53.8 |
| | 16 | −13.16 | 1.04 | 1.84660 | 23.9 |
| | 17 | −23.70 | 0.10 | | |
| | 18 | 42.13 | 2.92 | 1.81600 | 46.6 |
| | 19 | −137.95 | D19 (variable) | | |
| G4 | 20 | −33.10 | 0.81 | 1.80400 | 46.6 |
| | 21 | 11.38 | 5.69 | 1.84660 | 23.9 |
| | 22 | 85.98 | 8.37 | | |
| G5 | 23 | −70.57 | 2.73 | 1.83480 | 42.7 |
| | 24 | 70.57 | 1.06 | | |
| | 25 | 23.83 | 1.02 | 1.83480 | 42.7 |
| | 26 | 12.97 | 7.92 | 1.56732 | 42.8 |
| | 27 | −42.96 | 0.50 | | |
| | 28 | 57.15 | 1.00 | 1.84660 | 23.9 |
| | 29 | 13.26 | 6.02 | 1.62041 | 60.3 |
| | 30 | −58.36 | 0.10 | | |
| | 31* | 137.67 | 3.57 | 1.49700 | 81.3 |
| | 32 | −26.33 | 0.00 | | |
| GC | 33 | ∞ | 21.00 | 1.70154 | 41.1 |
| | 34 | ∞ | 6.75 | 1.51633 | 64.0 |
| | 35 | ∞ | Bf = 8.24 | | |

Table 8 below lists the values of the constants K, $A_4$, $A_6$, $A_8$, and $A_{10}$ used in Equation (A) above for the aspheric lens surface #31 of Table 7. Aspheric coefficients that are not present in Table 8 are zero. An "E" in the data indicates that the number following the "E" is the exponent to the base 10. For example, "1.0E−2" represents the number $1.0\times10^{-2}$.

TABLE 8

| | |
|---|---|
| surface #31: | K = 1 |
| | $A_4$ = −0.21283E−5 |
| | $A_6$ = 0.14120E−6 |
| | $A_8$ = −0.20977E−9 |
| | $A_{10}$ = 0.95490E−11 |

Table 9 below lists the values at the wide-angle end, at a middle position and at the telephoto end, of the focal length f, the FNO., and the variable on-axis surface spacings D6, D13, and D19 between the lens groups that move during zooming of the rear focus zoom lens according to Embodiment 4.

TABLE 9

| | f | FNO. | D6 | D13 | D19 |
|---|---|---|---|---|---|
| wide-angle end | 4.46 | 1.66 | 0.82 | 56.54 | 2.20 |
| middle position | 17.84 | 1.93 | 22.31 | 27.97 | 9.27 |
| telephoto end | 61.54 | 2.40 | 31.20 | 8.84 | 19.51 |

Figure 13A:
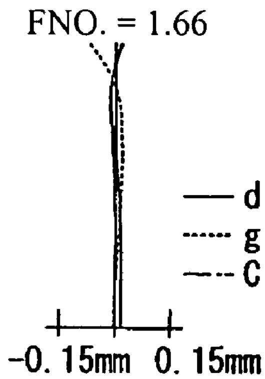
FIGS. 13A–13D show the spherical aberration, astigmatism, distortion, and lateral color, respectively, at the wide-angle end of the rear focus zoom lens according to Embodiment 4.
Figure 13B:
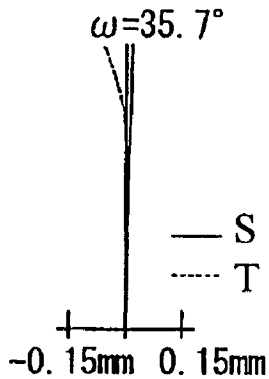
Figure 13C:
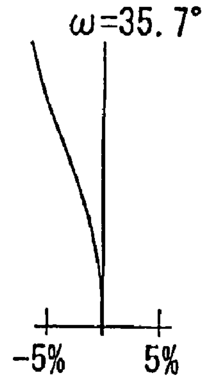
Figure 13D:
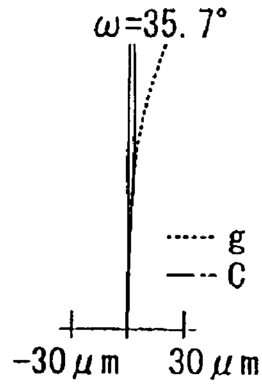
Figure 14A:
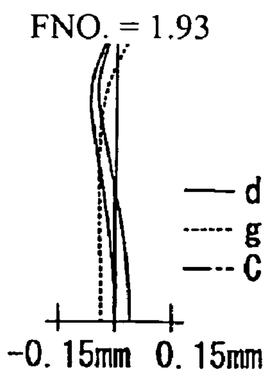
FIGS. 14A–14D show the spherical aberration, astigmatism, distortion, and lateral color, respectively, in the middle of the zoom range of the rear focus zoom lens according to Embodiment 4.
Figure 14B:
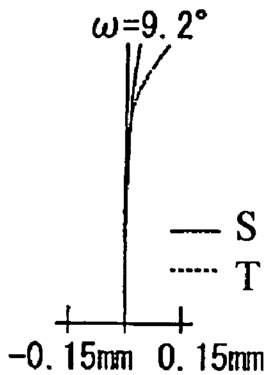
Figure 14C:
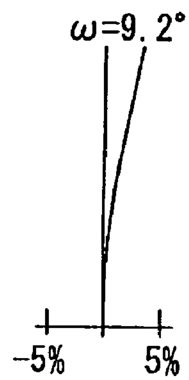
Figure 14D:
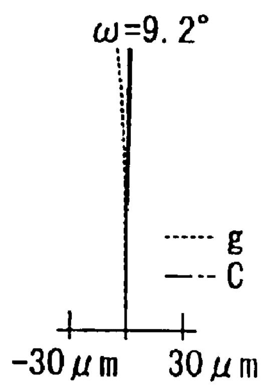
Figure 15A:
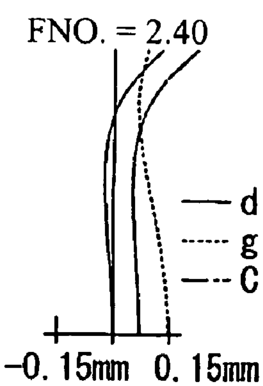
FIGS. 15A–15D show the spherical aberration, astigmatism, distortion, and lateral color, respectively, at the telephoto end of the rear focus zoom lens according to Embodiment 4.
Figure 15B:
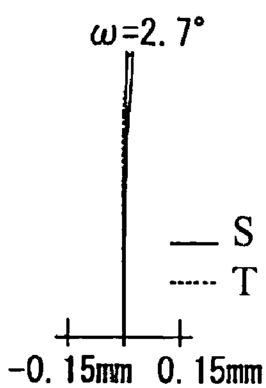
Figure 15C:
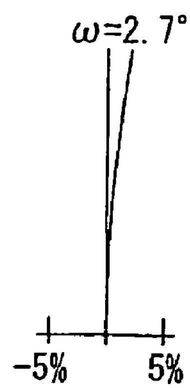
Figure 15D:
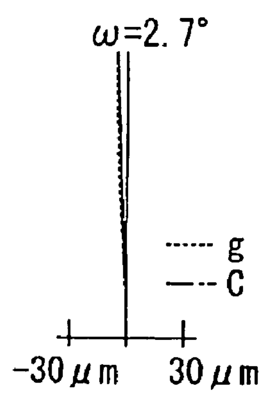

FIGS. 13A–13D show the spherical aberration, astigmatism, distortion, and lateral color, respectively, at the wide-angle end (FNO.=1.66, f=4.46 mm, and ω (the half-field angle)= 35.7°), FIGS. 14A–14D show the spherical aberration, astigmatism, distortion, and lateral color, respectively, in the middle of the zoom range (FNO.=1.93, f=17.84 mm, and ω (the half-field angle)=9.2°), and FIGS. 15A–15D show the spherical aberration, astigmatism, distortion, and lateral color, respectively, at the telephoto end (FNO.=2.40, f=61.54 mm, and ω (the half-field angle)=2.7°) of the real focus zoom lens according to Embodiment 4. The spherical aberration is shown in FIGS. 13A, 14A, and 15A for the d-line (587.6 nm), g-line (435.8 nm), and C-line (656.3 nm), and the astigmatism is shown in FIGS. 13B, 14B and 15B for the sagittal image surface S and the tangential image surface T. In FIGS. 13C, 14C and 15C, the distortion is shown for the d-line. In FIGS. 13D, 14D, and 15D the lateral color is shown for the g-line and the C-line, both relative to the d-line. As is apparent from these figures, these aberrations are favorably corrected over the entire range of zoom for this embodiment.

Embodiment 5

FIG. 12 is also representative of the basic lens element configuration and lens group positions of the rear focus zoom lens according to Embodiment 5 at the wide-angle end W and at the telephoto end T. This embodiment has a zoom ratio of approximately 14. In this embodiment as well, it is preferable that the fifth lens group G5 satisfy the above Condition (1).

Table 10 below lists the lens group and the surface number #, in order from the object side, the radius of curvature R (in mm) of each surface, the on-axis spacing D (in mm) between surfaces, as well as the index of refraction $N_d$ and the Abbe Number $\upsilon_d$ (both at the d-line) of each optical element of the rear focus zoom lens according to Embodiment 5. The surface 31 having a * to the right of the surface number is aspheric, having a shape defined by Equation (A) above.

TABLE 10

| Group | # | R | D | $N_d$ | $\nu_d$ |
|---|---|---|---|---|---|
| G1 | 1 | 288.49 | 1.80 | 1.84665 | 23.8 |
| | 2 | 45.47 | 5.32 | | |
| | 3 | 103.06 | 6.25 | 1.60300 | 65.4 |
| | 4 | −103.06 | 0.10 | | |
| | 5 | 40.39 | 6.95 | 1.77250 | 49.6 |
| | 6 | −564.06 | D6 (variable) | | |
| G2 | 7 | 65.87 | 0.80 | 1.83480 | 42.7 |
| | 8 | 15.47 | 2.70 | | |
| | 9 | −84.01 | 0.80 | 1.83480 | 37.1 |
| | 10 | 51.25 | 2.03 | | |
| | 11 | −21.05 | 0.80 | 1.83480 | 42.7 |
| | 12 | 11.67 | 4.98 | 1.80517 | 25.4 |
| | 13 | −63.20 | D13 (variable) | | |
| G3 | 14 | ∞ (stop) | 2.00 | | |
| | 15 | −88.23 | 7.35 | 1.71299 | 53.8 |
| | 16 | −13.62 | 0.80 | 1.84665 | 23.8 |
| | 17 | −23.80 | 0.10 | | |
| | 18 | 37.65 | 2.72 | 1.81600 | 46.6 |
| | 19 | −387.60 | D19 (variable) | | |
| G4 | 20 | −32.34 | 0.80 | 1.80400 | 46.6 |
| | 21 | 11.48 | 5.45 | 1.84665 | 23.8 |
| | 22 | 68.06 | 8.37 | | |
| G5 | 23 | −74.57 | 3.62 | 1.83480 | 42.7 |
| | 24 | 74.57 | 1.00 | | |
| | 25 | 23.78 | 0.80 | 1.83480 | 42.7 |
| | 26 | 13.86 | 8.21 | 1.53171 | 48.8 |
| | 27 | −32.68 | 0.11 | | |
| | 28 | 64.57 | 1.00 | 1.84665 | 23.8 |
| | 29 | 15.95 | 5.46 | 1.61800 | 63.3 |
| | 30 | −60.55 | 0.10 | | |
| | 31* | 158.80 | 3.33 | 1.49700 | 81.5 |
| | 32 | −29.86 | 0.00 | | |

TABLE 10-continued

| Group | # | R | D | $N_d$ | $\nu_d$ |
|---|---|---|---|---|---|
| GC | 33 | ∞ | 21.00 | 1.70154 | 41.1 |
| | 34 | ∞ | 6.75 | 1.51633 | 64.0 |
| | 35 | ∞ | Bf = 8.25 | | |

Table 11 below lists the values of the constants K, $A_4$, $A_6$, $A_8$, and $A_{10}$ used in Equation (A) above for tile aspheric lens surface #31 of Table 10. Aspheric coefficients that are not present in Table 11 are zero. An "E" in the data indicates that the number following the "E" is the exponent to the base 10. For example, "1.0E−2" represents the number $1.0\times10^{-2}$.

TABLE 11

| | |
|---|---|
| surface #31: | K = 1 |
| | $A_4$ = −0.95794E−5 |
| | $A_6$ = 0.11780E−6 |
| | $A_8$ = −0.72785E−9 |
| | $A_{10}$ = 0.83737E−11 |

Table 12 below lists the values at the wide-angle end, at a middle position and at the telephoto end, of the focal length f, the FNO., and the variable on-axis surface spacings D6, D13, and D19 between the lens groups that move during zooming of the rear focus zoom lens according to Embodiment 5.

TABLE 12

| | f | FNO. | D6 | D13 | D19 |
|---|---|---|---|---|---|
| wide-angle end | 4.46 | 1.66 | 0.81 | 56.18 | 2.31 |
| middle position | 17.82 | 1.98 | 22.79 | 27.39 | 9.13 |
| telephoto end | 60.60 | 2.48 | 31.86 | 8.52 | 18.92 |

Figure 16A:
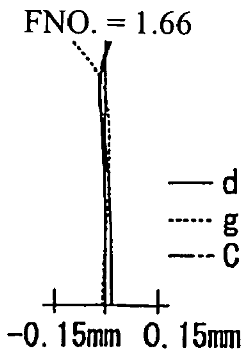
FIGS. 16A–16D show the spherical aberration, astigmatism, distortion, and lateral color, respectively, at the wide-angle end of the rear focus zoom lens according to Embodiment 5.
Figure 16B:
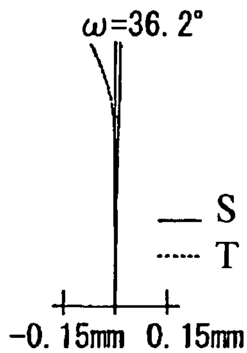
Figure 16C:
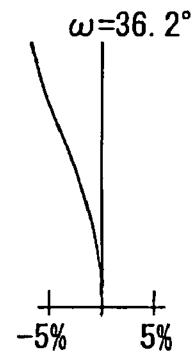
Figure 16D:
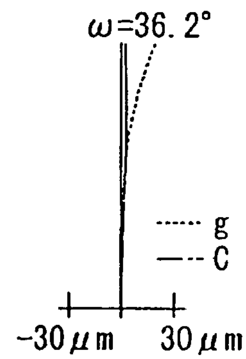
Figure 17A:
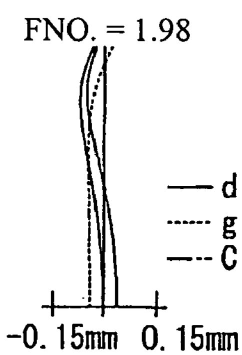
FIGS. 17A–17D show the spherical aberration, astigmatism, distortion, and lateral color, respectively, in the middle of the zoom range of the rear focus zoom lens according to Embodiment 5.
Figure 17B:
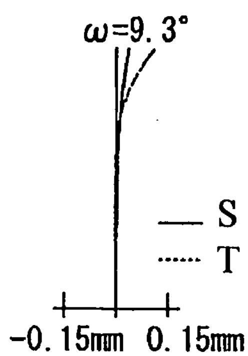
Figure 17C:
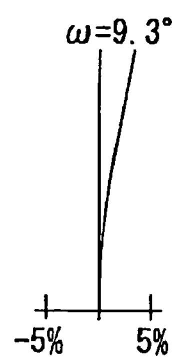
Figure 17D:
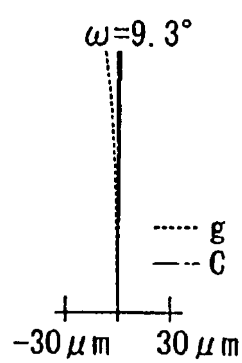
Figure 18A:
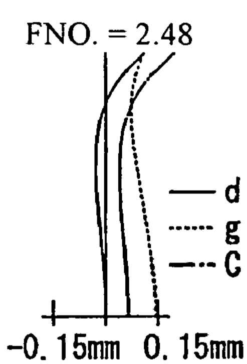
FIGS. 18A–18D show the spherical aberration, astigmatism, distortion, and lateral color, respectively, at the telephoto end of the rear focus zoom lens according to Embodiment 5.
Figure 18B:
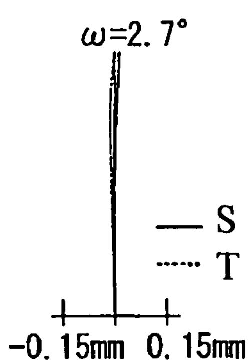
Figure 18C:
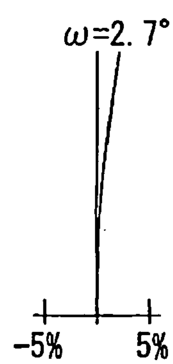
Figure 18D:
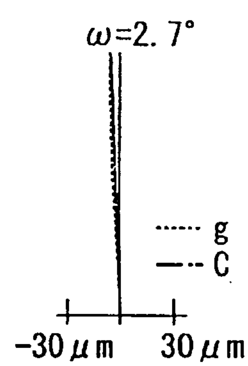

FIGS. 16A–16D show the spherical aberration, astigmatism, distortion, and lateral color, respectively, at the wide-angle end (FNO.=1.66, f=4.46 mm, and ω (the half-field angle)= 36.2°), FIGS. 17A–17D show the spherical aberration, astigmatism, distortion, and lateral color, respectively, in the middle of the zoom range (FNO.=1.98, f=17.82 mm, and ω (the half-field angle)=9.3°), and FIGS. 18A–18D show the spherical aberration, astigmatism, distortion, and lateral color, respectively, at the telephoto end (FNO.=2.48, f=60.60 mm, and ω (the half-field angle)=2.7°) of the real focus zoom lens according to Embodiment 5. The spherical aberration is shown in FIGS. 16A, 17A, and 18A for the d-line (587.6 nm), g-line (435.8 nm), and C-line (656.3 nm), and the astigmatism is shown in FIGS. 16B, 17B and 18B for the sagittal image surface S and the tangential image surface T. In FIGS. 16C, 17C and 18C, the distortion is shown for the d-line. In FIGS. 16D, 17D, and 18D the lateral color is shown for the g-line and the C-line, both relative to the d-line As is apparent from these figures, these aberrations are favorably corrected over the entire range of zoom for this embodiment.

Embodiment 6

FIG. 12 is also representative of the basic lens element configuration and lens group positions of the rear focus zoom lens according to Embodiment 6 at the wide-angle end W and at the telephoto end T. This embodiment has a zoom ratio of approximately 14. In this embodiment as well, it is preferable that the fifth lens group G5 satisfy the above Condition (1).

Table 13 below lists the lens group and the surface number #, in order from the object side, the radius of curvature R (in mm) of each surface, the on-axis spacing D (in mm) between surfaces, as well as the index of refraction $N_d$ and the Abbe Number $\upsilon_d$ (both at the d-line) of each optical element of the rear focus zoom lens according to Embodiment 6. The surface 31 having a * to the right of the surface number is aspheric, having a shape defined by Equation (A) above.

TABLE 13

| Group | # | R | D | $N_d$ | $\nu_d$ |
|---|---|---|---|---|---|
| G1 | 1 | 326.35 | 1.80 | 1.84660 | 23.9 |
| | 2 | 45.49 | 4.18 | | |
| | 3 | 100.04 | 6.53 | 1.60300 | 65.4 |
| | 4 | −100.04 | 0.10 | | |
| | 5 | 39.38 | 7.19 | 1.77250 | 49.6 |
| | 6 | −556.54 | D6 (variable) | | |
| G2 | 7 | 68.04 | 0.80 | 1.83480 | 42.7 |
| | 8 | 15.60 | 2.57 | | |
| | 9 | −87.36 | 0.80 | 1.83480 | 42.7 |
| | 10 | 45.64 | 2.01 | | |
| | 11 | −20.62 | 0.80 | 1.83480 | 42.7 |
| | 12 | 11.38 | 5.29 | 1.80517 | 25.4 |
| | 13 | −62.62 | D13 (variable) | | |
| G3 | 14 | ∞ (stop) | 2.10 | | |
| | 15 | −65.14 | 6.97 | 1.71299 | 53.8 |
| | 16 | −13.16 | 1.00 | 1.84660 | 23.9 |
| | 17 | −23.68 | 0.10 | | |
| | 18 | 42.28 | 2.85 | 1.81600 | 46.6 |
| | 19 | −137.18 | D19 (variable) | | |
| G4 | 20 | −33.25 | 0.81 | 1.80400 | 46.6 |
| | 21 | 11.39 | 5.64 | 1.84660 | 23.9 |
| | 22 | 86.80 | 8.73 | | |
| G5 | 23 | −70.53 | 2.13 | 1.83480 | 42.7 |
| | 24 | 70.53 | 1.00 | | |
| | 25 | 23.85 | 1.00 | 1.83480 | 42.7 |
| | 26 | 12.97 | 8.04 | 1.56732 | 42.8 |
| | 27 | −42.93 | 0.50 | | |
| | 28 | 57.47 | 1.00 | 1.84660 | 23.9 |
| | 29 | 13.24 | 6.05 | 1.62041 | 60.3 |
| | 30 | −58.24 | 0.10 | | |
| | 31* | 136.88 | 3.61 | 1.49700 | 81.3 |
| | 32 | −26.32 | 0.00 | | |
| GC | 33 | ∞ | 21.00 | 1.70154 | 41.1 |
| | 34 | ∞ | 6.75 | 1.51633 | 64.0 |
| | 35 | ∞ | Bf = 8.25 | | |

Table 14 below lists the values of the constants K, $A_4$, $A_6$, $A_8$, and $A_{10}$ used in Equation (A) above for the aspheric lens surface #31 of Table 13. Aspheric coefficients that are not present in Table 14 are zero. An "E" in the data indicates that the number following the "E" is the exponent to the base 10. For example, "1.0E−2" represents the number $1.0\times10^{-2}$.

TABLE 14

| | |
|---|---|
| surface 31: | K = 1 |
| | $A_4$ = −0.20478E−5 |
| | $A_6$ = 0.14135E−6 |
| | $A_8$ = −0.21168E−9 |
| | $A_{10}$ = 0.94777E−11 |

Table 15 below lists the values at the wide-angle end, at a middle position and at the telephoto end, of the focal length f, the FNO., and the variable on-axis surface spacings D6, D13, and D19 between the lens groups that move during zooming of the rear focus zoom lens according to Embodiment 6.

TABLE 15

| | f | FNO. | D6 | D13 | D19 |
|---|---|---|---|---|---|
| wide-angle end | 4.40 | 1.66 | 0.78 | 56.54 | 2.05 |
| middle position | 17.58 | 1.93 | 22.35 | 27.94 | 9.07 |
| telephoto end | 59.78 | 2.39 | 31.21 | 9.09 | 19.06 |

Figure 19A:
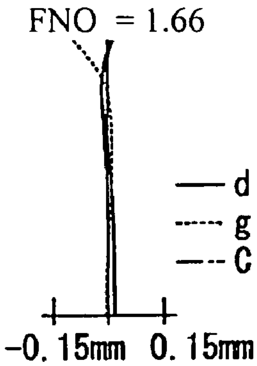
FIGS. 19A–19D show the spherical aberration, astigmatism, distortion, and lateral color, respectively, at the wide-angle end of the rear focus zoom lens according to Embodiment 6.
Figure 19B:
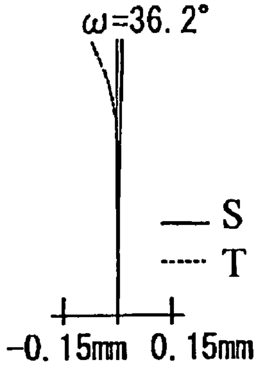
Figure 19C:
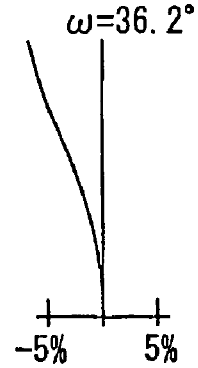
Figure 19D:
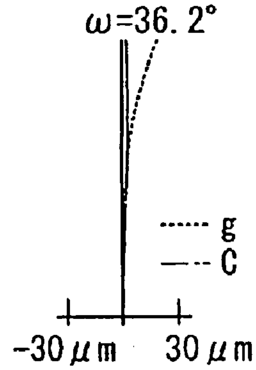
Figure 20A:
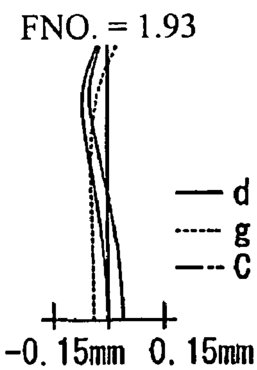
FIGS. 20A–20D show the spherical aberration, astigmatism, distortion, and lateral color, respectively, in the middle of the zoom range of the rear focus zoom lens according to Embodiment 6.
Figure 20B:
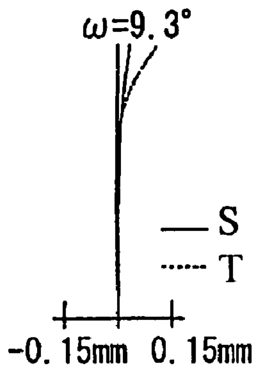
Figure 20C:
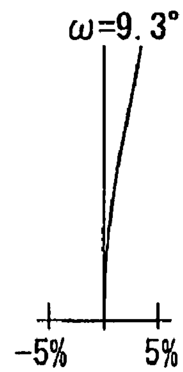
Figure 20D:
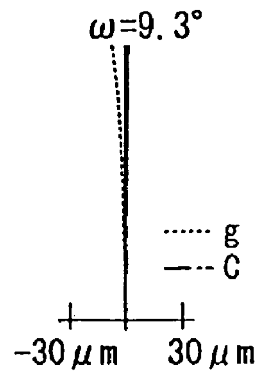
Figure 21A:
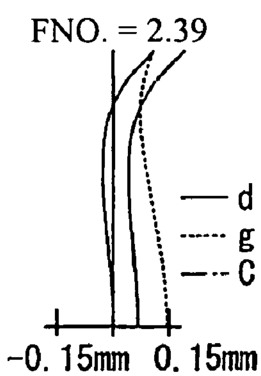
FIGS. 21A–21D show the spherical aberration, astigmatism, distortion, and lateral color, respectively, at the telephoto end of the rear focus zoom lens according to Embodiment 6.
Figure 21B:
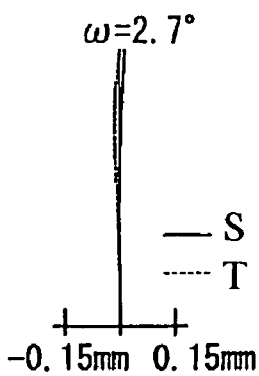
Figure 21C:
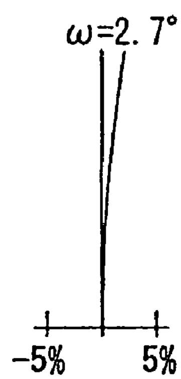
Figure 21D:
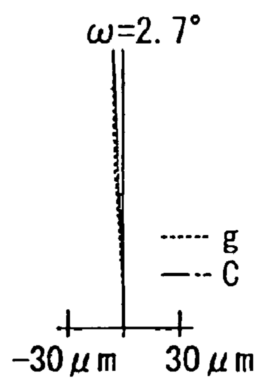

FIGS. 19A–19D show the spherical aberration, astigmatism, distortion, and lateral color, respectively, at the wide-angle end (FNO.=1.66, f=4.40 mm, and ω (the half-field angle)= 36.2°), FIGS. 20A–20D show the spherical aberration, astigmatism, distortion, and lateral color, respectively, in the middle of the zoom range (FNO.=1.93, f=17.58 mm, and ω (the half-field angle)=9.3°), and FIGS. 21A–21D show the spherical aberration, astigmatism, distortion, and lateral color, respectively, at the telephoto end (FNO.=2.39, f=59.78 mm, and ω (the half-field angle)=2.7°) of the rear focus zoom lens according Embodiment 6. The spherical aberration is shown in FIGS. 19A, 20A, and 21A for the d-line (587.6 nm), g-line (435.8 nm), and C-line (656.3 nm), and the astigmatism is shown in FIGS. 19B, 20B and 21B for the sagittal image surface S and the tangential image surface T. In FIGS. 19C, 20C and 21C, the distortion is shown for the d-line. In FIGS. 19D, 20D, and 21D the lateral color is shown for the g-line and the C-line, both relative to the d-line. As is apparent from these figures, these aberrations are favorably corrected over the entire range of zoom for this embodiment.

Table 16 below shows the values of Condition (1) that are relevant to Embodiments 4–6 of the invention. As can be seen from comparing the values of f5/fw listed in Table 16 with the lower and upper limits of Condition (1), each of these embodiments satisfies Condition (1).

TABLE 16

| Condition (1) value | Embodiment 4 | Embodiment 5 | Embodiment 6 |
|---|---|---|---|
| f5/fw | 6.01 | 5.86 | 6.14 |

As seen from the numerical data and graphical representations of the various aberrations, each of the embodiments of the invention provides a compact rear focus zoom lens having a wide angle of view and a high zoom ratio, and wherein the various aberrations are favorably corrected.

The invention being thus described, it will be obvious that the same may be varied in many ways. For example the radii of curvature, surface spacings, refractive indexes and Abbe numbers of the lens elements are not limited to the values given in the embodiments but may be varied, and the rear focus zoom lens can be applied to optical devices other than video cameras, such as film cameras. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A rear focus zoom lens comprising, in order from the object side:

a first lens group having positive refractive power;

a second lens group having negative refractive power;

a third lens group having positive refractive power and including a stop;

a fourth lens group having negative refractive power; and a fifth lens group having positive refractive power;

wherein the second lens group and the third lens group are moved along the optical axis for zooming;

the fourth lens group is moved along the optical axis for focusing; and the fourth lens group comprises a doublet consisting of a negative lens element and a positive lens element.

2. The rear focus zoom lens according to claim 1, wherein the second lens group comprises, in order from the object side:

two negative lens components; and a doublet consisting of a negative lens element and a positive lens element.

3. The rear focus zoom lens according to claim 1, wherein the fifth lens group comprises, in order from the object side:

a biconcave lens component;

two doublets, each consisting of a negative lens element and a positive lens element; and a positive lens element having at least one aspherical surface.

4. The rear-focus zoom lens according to claim 2, wherein the fifth lens group comprises, in order from the object side:

a biconcave lens component;

two doublets, each consisting of a negative lens element and a positive lens element; and a positive lens element having at least one aspherical surface.

5. The rear focus zoom lens according to claim 3, wherein the following condition is satisfied:

$$5.7 < f5/fw < 6.3$$

where f5 is the focal length of the fifth lens group, and fw is the focal length of the rear focus zoom lens at the wide-angle end.

6. The rear focus zoom lens according to claim 4, wherein the following condition is satisfied:

$$5.7 < f5/fw < 6.3$$

where f5 is the focal length of the fifth lens group, and fw is the focal length of the rear focus zoom lens at the wide-angle end.

7. The rear focus zoom lens according to claim 2, wherein said two negative lens components are each a negative lens element.

8. The rear-focus zoom lens according to claim 3, wherein said biconcave lens component is a biconcave lens element.

9. The rear focus zoom lens according to claim 4, wherein said biconcave lens component is a biconcave lens element.

10. The rear focus zoom lens according to claim 8, wherein the following condition is satisfied:

$$5.7 < f5/fw < 6.3$$

where f5 is the focal length of the fifth lens group, and fw is the focal length of the rear focus zoom lens at the wide-angle end.

11. The rear focus zoom lens according to claim 9, wherein the following condition is satisfied:

$$5.7 < f5/fw < 6.3$$

where f5 is the focal length of the fifth lens group, and fw is the focal length of the rear focus zoom lens at the wide-angle end.

* * * * *

UNITED STATES PATENT AND TRADEMARK OFFICE
CERTIFICATE OF CORRECTION

PATENT NO. : 6,985,303 B2
DATED : January 10, 2006
INVENTOR(S) : Takatsuki

It is certified that error appears in the above-identified patent and that said Letters Patent is hereby corrected as shown below:

Column 1,
Line 16, change “Tile” to -- The --;

Column 3,
Line 43, change “three” to -- five --;

Column 6,
Line 14, change “Surface” to -- surface --;

Column 11,
Line 42, change “real” to -- rear --;

Column 14,
Line 11, change “tile” to -- the --; and
Line 48, change “real” to -- rear --.

Signed and Sealed this

Eighteenth Day of April, 2006

JON W. DUDAS
*Director of the United States Patent and Trademark Office*